US010903670B2

(12) United States Patent
Eshleman et al.

(10) Patent No.: US 10,903,670 B2
(45) Date of Patent: Jan. 26, 2021

(54) ACCESSORIES WITH BATTERY CHARGER INTERFACE AND BATTERY PACK INTERFACE

(71) Applicant: Black & Decker Inc., New Britain, CT (US)

(72) Inventors: Scott Eshleman, Parkville, MD (US); Bhanuprasad V. Gorti, Perry Hall, MD (US)

(73) Assignee: Black & Decker Inc., New Britain, CT (US)

( * ) Notice: Subject to any disclaimer, the term of this patent is extended or adjusted under 35 U.S.C. 154(b) by 213 days.

(21) Appl. No.: 15/829,351

(22) Filed: Dec. 1, 2017

(65) Prior Publication Data

US 2018/0175644 A1    Jun. 21, 2018

Related U.S. Application Data

(60) Provisional application No. 62/429,060, filed on Dec. 1, 2016.

(51) Int. Cl.
*H02J 7/00* (2006.01)
*H01R 33/96* (2006.01)
*H02J 7/02* (2016.01)

(52) U.S. Cl.
CPC ............ *H02J 7/0042* (2013.01); *H01R 33/96* (2013.01); *H02J 7/00* (2013.01); *H02J 7/007* (2013.01); *H02J 7/0036* (2013.01); *H02J 7/022* (2013.01); *H02J 7/0026* (2013.01); *H02J 2207/20* (2020.01)

(58) Field of Classification Search
CPC ...... H01R 33/96; H02J 7/0036; H02J 7/0042; H02J 7/0052; H02J 7/007; H02J 7/022; H02J 2007/0059; H02J 7/0026
USPC ........................................................ 307/20
See application file for complete search history.

(56) References Cited

U.S. PATENT DOCUMENTS

| | | | | |
|---|---|---|---|---|
| 5,780,993 | A * | 7/1998 | Tsang | H02J 7/0042 320/111 |
| 7,183,748 | B1 * | 2/2007 | Unno | H02J 7/0013 320/134 |
| 2005/0099156 | A1 * | 5/2005 | Brenner | H02J 7/0036 320/116 |
| 2006/0087283 | A1 * | 4/2006 | Phillips | B25F 5/00 320/114 |
| 2012/0104991 | A1 * | 5/2012 | Suzuki | H01M 2/1055 320/103 |
| 2014/0001853 | A1 * | 1/2014 | Hanawa | H02J 7/0004 307/38 |
| 2014/0117922 | A1 * | 5/2014 | Pham | H02J 7/0027 320/103 |
| 2014/0151079 | A1 * | 6/2014 | Furui | B25F 5/02 173/46 |
| 2014/0247011 | A1 * | 9/2014 | Wijeratne | H01M 10/425 320/112 |
| 2014/0302369 | A1 * | 10/2014 | Naito | H01M 2/1055 429/100 |

(Continued)

*Primary Examiner* — Daniel Kessie
*Assistant Examiner* — Brian K Baxter
(74) *Attorney, Agent, or Firm* — Michael Aronoff

(57) ABSTRACT

A device includes a first interface configured to connect to a battery charger, a second interface configured to connect to a battery pack and one or more accessory components that define the device. For example, the device may be a fan, a radio, a power adapter, a speaker, a light or other type of device.

14 Claims, 8 Drawing Sheets

(56) References Cited

U.S. PATENT DOCUMENTS

2016/0020443 A1* 1/2016 White .................. B25F 5/02
                                                318/245
2016/0072106 A1* 3/2016 Baumgartner ...... H01M 2/1022
                                                320/113

* cited by examiner

ACCESSORIES WITH BATTERY CHARGER INTERFACE AND BATTERY PACK INTERFACE

RELATED APPLICATIONS

This application claims priority under 35 U.S.C. § 119(e) to U.S. Provisional Patent Application No. 62/429,060, filed Dec. 1, 2016, titled "ACCESSORIES WITH BATTERY CHARGER INTERFACE AND BATTERY PACK INTERFACE."

TECHNICAL FIELD

This description relates to accessories having both a battery charger interface and a battery pack interface.

BACKGROUND

In industries, such as the cordless power tool industry, many tools are sold with removable battery packs. Typically, the removable battery packs are charged using a battery charger. The battery charger includes a power cord that is plugged into an outlet. To charge a removable battery pack, the battery pack is removed from the tool and inserted into the battery charger, which provides a constant current source to charge the battery pack. After charging the removable battery pack, the battery charger may be used to charge other removable battery packs. When a battery pack is not inserted into the battery charger, many users may leave the battery charger plugged into the outlet without any battery packs being charged. For example, in an environment with a work bench surface, users may leave the battery charger unused on top of the work bench with it plugged into the outlet for periods of time. In other environments, the battery charger also may be left unused for periods of time.

SUMMARY

According to one general aspect, a device includes a first interface configured to connect to a battery charger, a second interface configured to connect to a battery pack and one or more accessory components that define the device.

Implementations may include one or more of the following features. For example, the first interface is a separate and distinct interface from the second interface.

The first interface includes a female terminal to connect to the battery charger.

The second interface includes a male terminal to connect to the battery pack.

The device may further include a charger enable circuit connected to the first interface, where the charger enable circuit is configured to send a signal to the battery charger to indicate a presence of a battery when the device is coupled to the battery charger to enable the battery charger. The charger enable circuit may include a battery signal circuit that is configured to generate the signal that is sent to the battery charger to enable the battery charger. The battery signal circuit may be configured to regulate power received from the battery charger.

The accessory components may include a fan.
The accessory components may include a radio.
The accessory components may include a speaker.
The accessory components may include a light.
The accessory components may include a power adapter.
In another general aspect, a device includes a first interface configured to connect to a battery charger, a charger enable circuit connected to the first interface, where the charger enable circuit configured to send a signal to the battery charger to indicate a presence of a battery when the device is coupled to the battery charger to enable the battery charger and one or more accessory components that define the device.

Implementations may include one or more of the following features. For example, the accessory components may include a fan.

The charger enable circuit may include a battery signal circuit that is configured to generate the signal that is sent to the battery charger to enable the battery charger. The battery signal circuit may be configured to regulate power received from the battery charger.

The accessory components may include a radio.
The accessory components may include a speaker.
The accessory components may include a light.
The accessory components may include a power adapter.
The details of one or more implementations are set forth in the accompanying drawings and the description below. Other features will be apparent from the description and drawings, and from the claims.

DETAILED DESCRIPTION

This document describes accessories having both a battery pack interface and a battery charger interface. In this manner, the accessories may be powered by either a battery pack or by a battery charger. The battery pack interface may be a separate and distinct interface from the battery charger interface.

Figure 1:
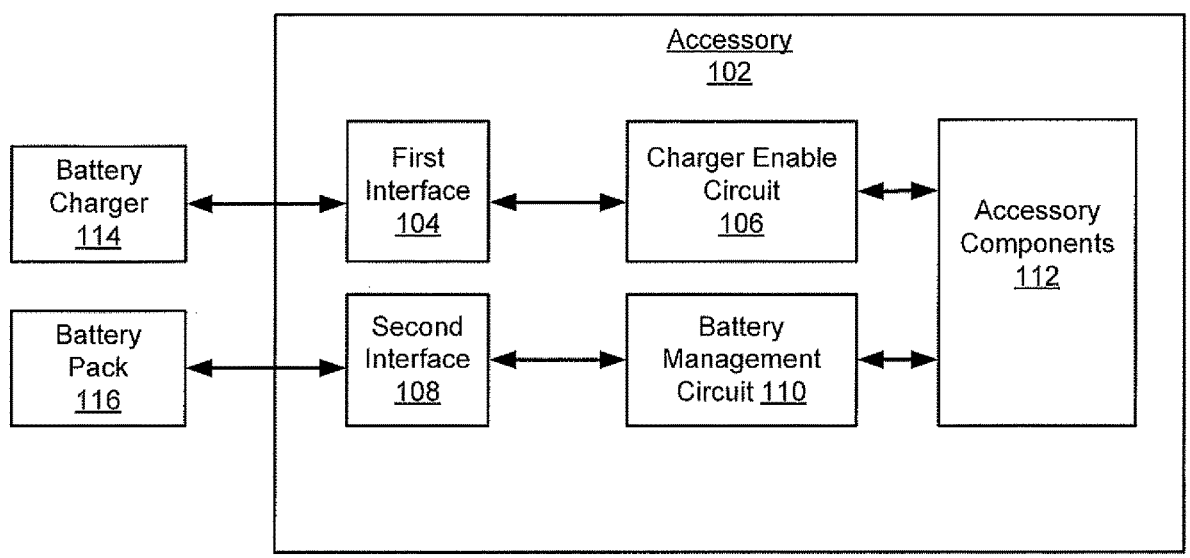
FIG. 1 is a block diagram of an example accessory, battery charger and battery pack.

FIG. 1 is a block diagram of an accessory 102. The accessory 102 includes a first interface 104 that is coupled to a charger enable circuit 106 and a second interface 108 that is coupled to a battery management circuit 110. The charger enable circuit 106 and the battery management circuit 110 are connected to accessory components 112. The first interface 104 is configured to mate with a battery charger 114 and enables the accessory 102 to receive power from the battery charger 114. The second interface 108 is configured to mate with a battery pack 116 and enables the accessory 102 to receive power from the battery pack 116.

The accessory 102 may be various different types of accessories. For example, the accessory 102 may be an articulating light. Other examples of accessories may include a fan, a radio, a speaker, a USB charger, a soldering iron, a multi-meter, a power adapter, and a laser projector. Other accessories are possible and it is understood that the examples provided are merely examples and not meant to limit the type of accessories that may be implemented as accessory 102. FIGS. 2A-2D, 3, 4 and 5, as discussed in more detail below, illustrate some non-limiting examples of the types of accessories that may be implemented.

The accessory components 112 may vary depending on the type of accessory 102. The accessory components 112 provide additional circuitry, electronics, and or other components needed to implement a particular accessory 102. For example, if the accessory 102 is an articulating light, then the accessory components 112 may include a light, a switch, and other circuits and/or electronics needed to implement the articulating light. In another example, if the accessory 102 is a speaker, then the accessory components 112 may include a speaker (e.g., a Bluetooth speaker), a communication module such as a Bluetooth module to receive signals from another device and other circuits and/or electronics needed to implement the speaker. It would be understood by someone of skill in the art the various accessory components 112 that might be needed to implement a particular accessory 102 without detailing all of the particular components for each example accessory discussed in this document.

In operation, the accessory 102 may receive power from either the battery charger 114 through the first interface 104 and the charger enable circuit 106 or from the battery pack 116 through the second interface 108 and the battery management circuit 110. That is, when the power is received from the battery charger 114 through the first interface 104, the second interface 108 may not be in operation. Similarly, when the power is received from the battery pack 116 through the second interface 108, the first interface 104 may not be in operation.

When using the battery charger 114 to power the accessory 102, the battery charger 114 is plugged into an outlet. The first interface 104 mates with the battery charger 114 to secure the accessory 102 to the battery charger 114 and to make an electrical connection between the accessory 102 and the battery charger 114 through the first interface 104. This is much like a battery pack 116 would mate with the battery charger 114. The first interface 104 would have a configuration very similar to an interface of a battery pack 116. The first interface 104 includes a terminal block having one or more terminals that mate with the terminals of the battery charger 114 to make the electrical connection. In one implementation, the terminal block on the first interface 104 may include female terminals to mate with the male terminals on the battery charger 114. In other implementations, the terminal block on the first interface 104 may include male terminals to mate with female terminals on the battery charger 114.

Figure 5:
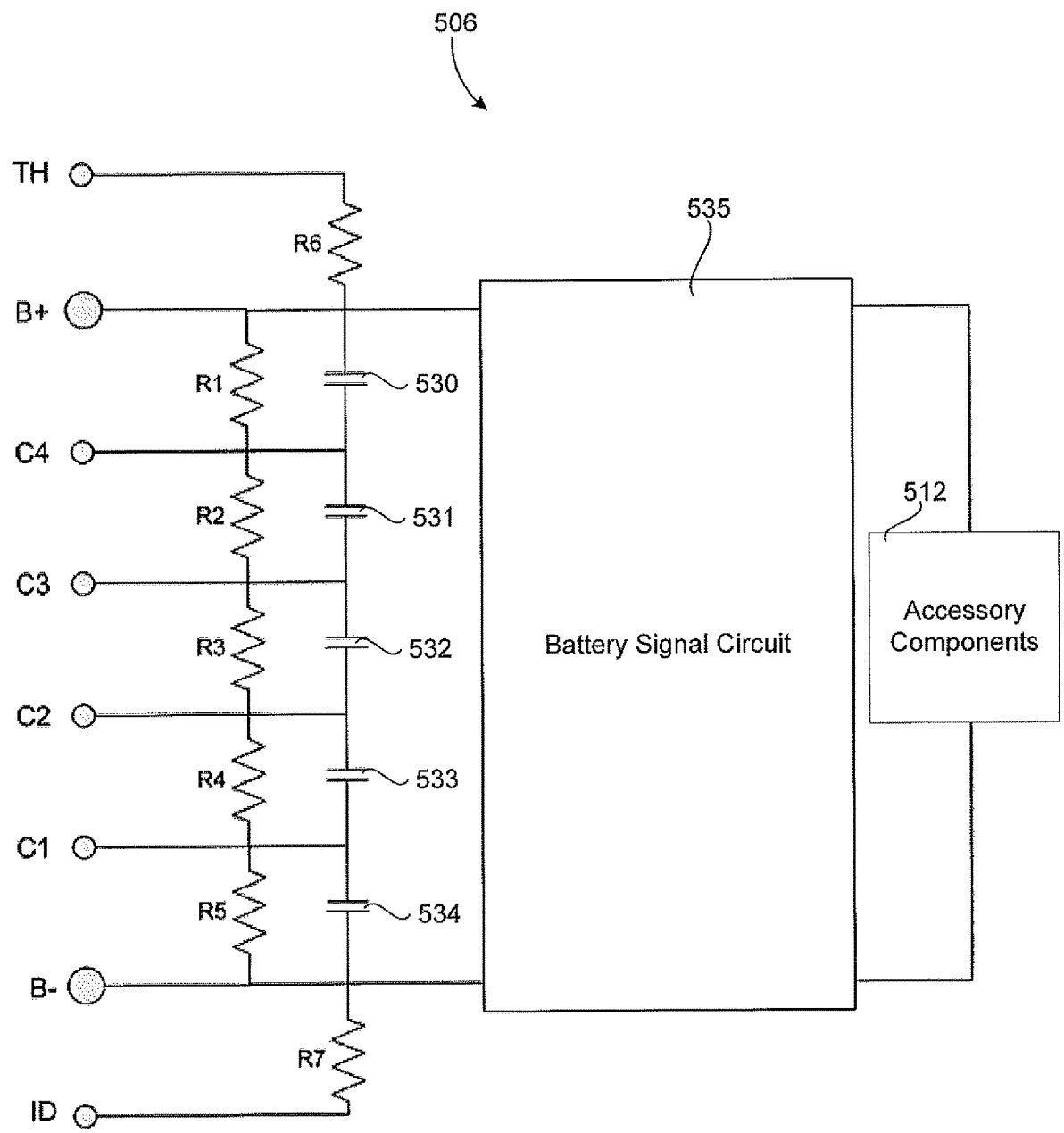
FIG. 5 is a schematic diagram of an example charger enable circuit.

The first interface 104 is connected to the charger enable circuit 106. The charger enable circuit 106 provides a battery present signal to the battery charger 114 through the first interface 104 to make the battery charger 114 believe that a battery pack is present in the battery charger 104 even though it is the accessory 102 that is present in the battery charger 114. In this manner, the battery charger 114 receives the battery present signal from the charger enable circuit 106 and provides power to the accessory 102 through the first interface 104. The charger enable circuit 106 also may provide an indication to the battery charger 114 of how much power to provide the accessory 102. The charger enable circuit 106 may include circuitry and/or electronics, including analog and/or digital electronics, to manage the power received from the battery pack 114, which provides power to the accessory 102 through the first interface 104. FIG. 5 below illustrates one example implementation of the charger enable circuit 106.

As discussed above, the accessory 102 may alternatively be powered by a battery pack 116. The second interface 108 mates with a battery pack 116 to secure the accessory 102 to the battery pack 116 and to make an electrical connection between the accessory 102 and the battery pack 116 through the second interface 108. This is much like a power tool or a battery charger 114 would mate with the battery pack 116. The second interface 108 would have a configuration very similar to an interface of the battery charger 114. The second interface 108 includes a terminal block having one or more terminals that mate with the terminals of the battery pack 116 to make the electrical connection. In one implementation, the terminal block on the second interface 108 may include male terminals to mate with the female terminals on the battery pack 116. In other implementations, the terminal block on the second interface 108 may include female terminals to mate with male terminals on the battery pack 116.

The second interface 108 is connected to the battery management circuit 110. The battery management circuit 110 includes circuitry and/or electronics, including analog and/or digital electronics, to manage the power received from the battery pack 116, which provides power to the accessory 102 through the second interface 108. The battery management circuit 110 may include a low current leakage circuit, which may be needed once the battery pack 116 gets to a low state of charge.

Figure 2A:
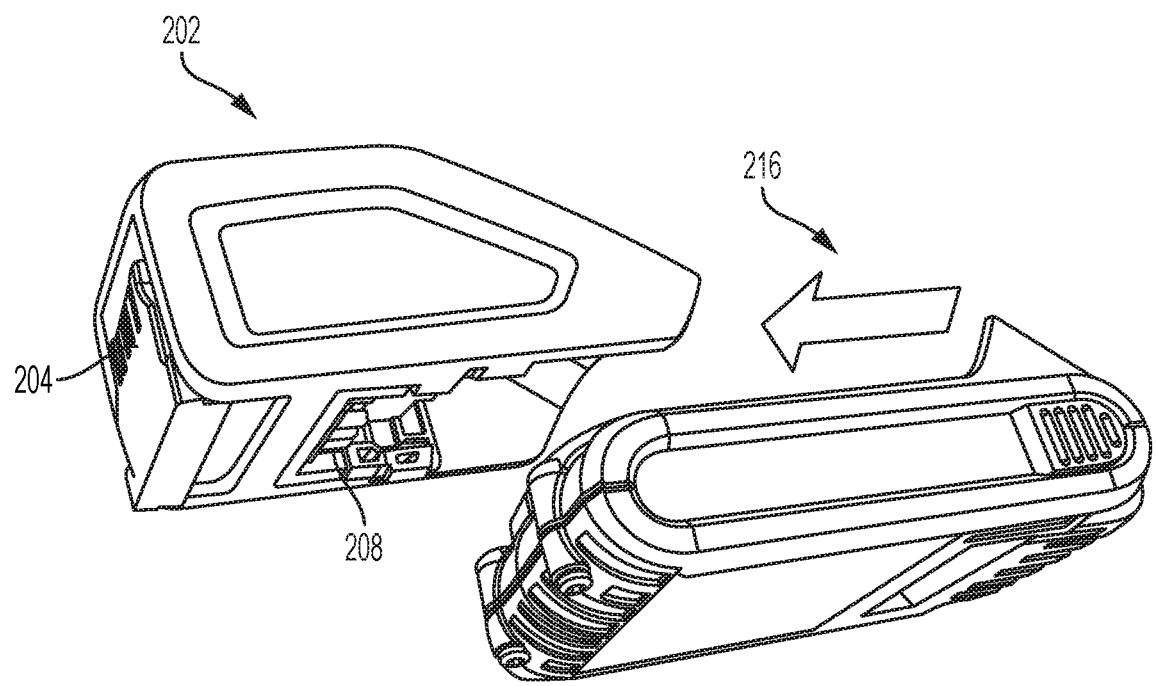
FIG. 2A shows an example accessory and a battery pack.
Figure 2B:
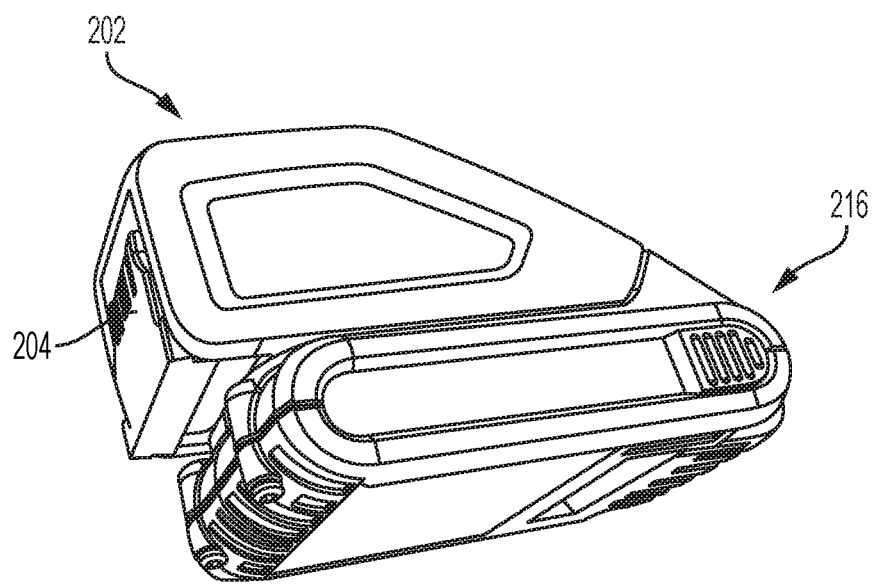
FIG. 2B shows the example accessory of FIG. 2A mated with the battery pack of FIG. 2A.

FIG. 2A illustrates an example accessory 202 and a battery pack 216 prior to mating. FIG. 2B illustrates the example accessory 202 mated with the battery pack 216. The accessory 202 includes the features and functions of the accessory 102 of FIG. 1 and may be any type of accessory as described above with respect to the accessory 102 of FIG. 1. The accessory 202 includes a first interface 204 and a second interface 208. The first interface 204 and the second interface 208 include the features and functions of the first interface 104 and the second interface 108 of FIG. 1. The first interface 204 is configured to mate with a battery charger. The second interface 208 is configured to make with the battery pack 216. In this example, the second interface 208 includes male terminals that mate with the corresponding female terminals on the battery pack 216. In FIG. 2B, the accessory 202 slidably engages with the battery pack 216 and locks in place onto the battery pack 216. When the second interface 208 mates with the battery pack terminals, power is provided from the battery pack 216 to the accessory 202 through the second interface 208. In this example, the first interface 204 is not used.

Figure 2C:
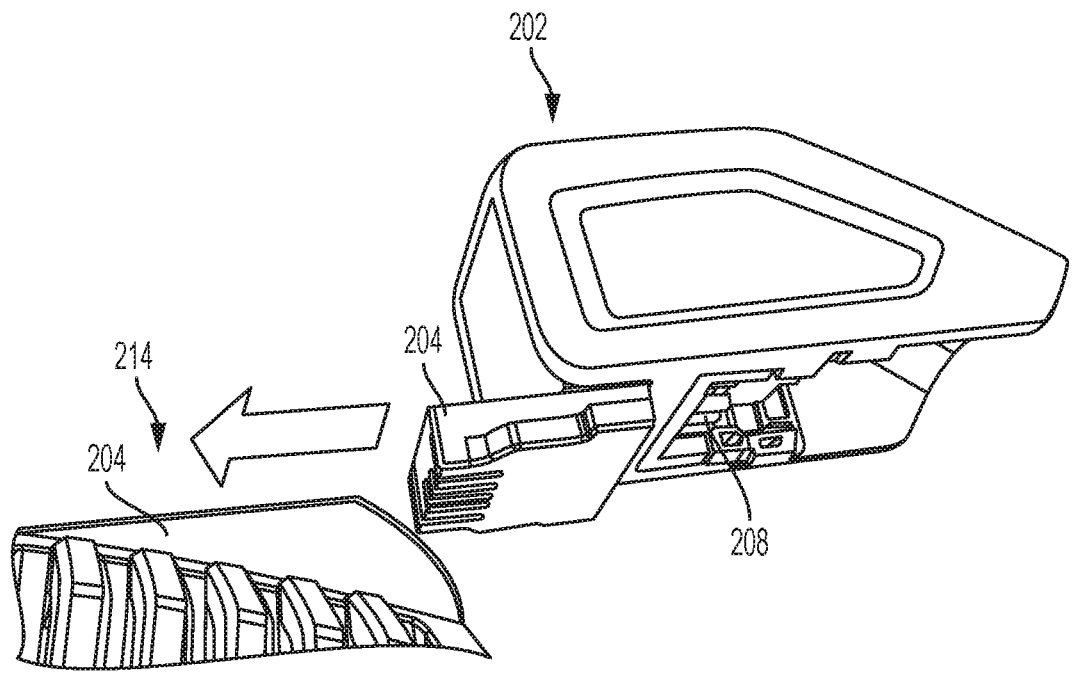
FIG. 2C shows the example accessory of FIG. 2A and a battery charger.
Figure 2D:
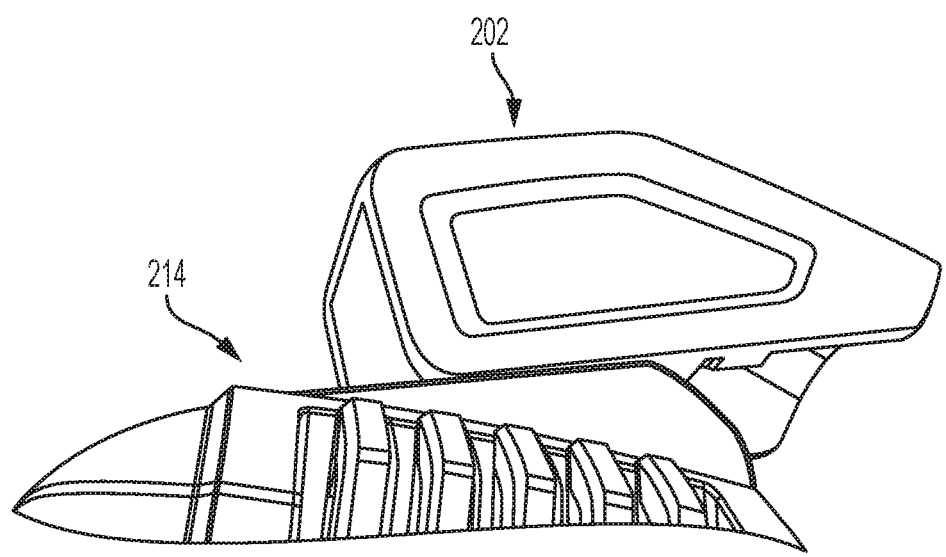
FIG. 2D shows the example accessory of FIG. 2A mated with the battery charger of FIG. 2C.

FIG. 2C illustrates the example accessory 202 and a battery charger 214 prior to mating. FIG. 2D illustrates the accessory 202 mated with the battery charger 214. In this example, the first interface 204 is implemented on a hinge to rotate away from the accessory 202 such that it may engage the battery charger 214. The terminals in the first interface 204 are female terminals that mate with corresponding male terminals on the battery charger 214. In FIG. 2D, the accessory 202 slidably engages with the battery charger 214 and locks in place onto the battery charger 214. When the first interface 204 mates with the battery charger terminals, power is provided from the battery charger 214 to the accessory 202 through the first interface 204. Once the terminals on the first interface 204 are engaged with the terminals on the battery charger 214, the charger enable circuit 106 of FIG. 1 sends a signal to the battery charger to enable the battery charger to start providing power to the accessory 202. In this example, the second interface 208 is not used.

Figure 3:
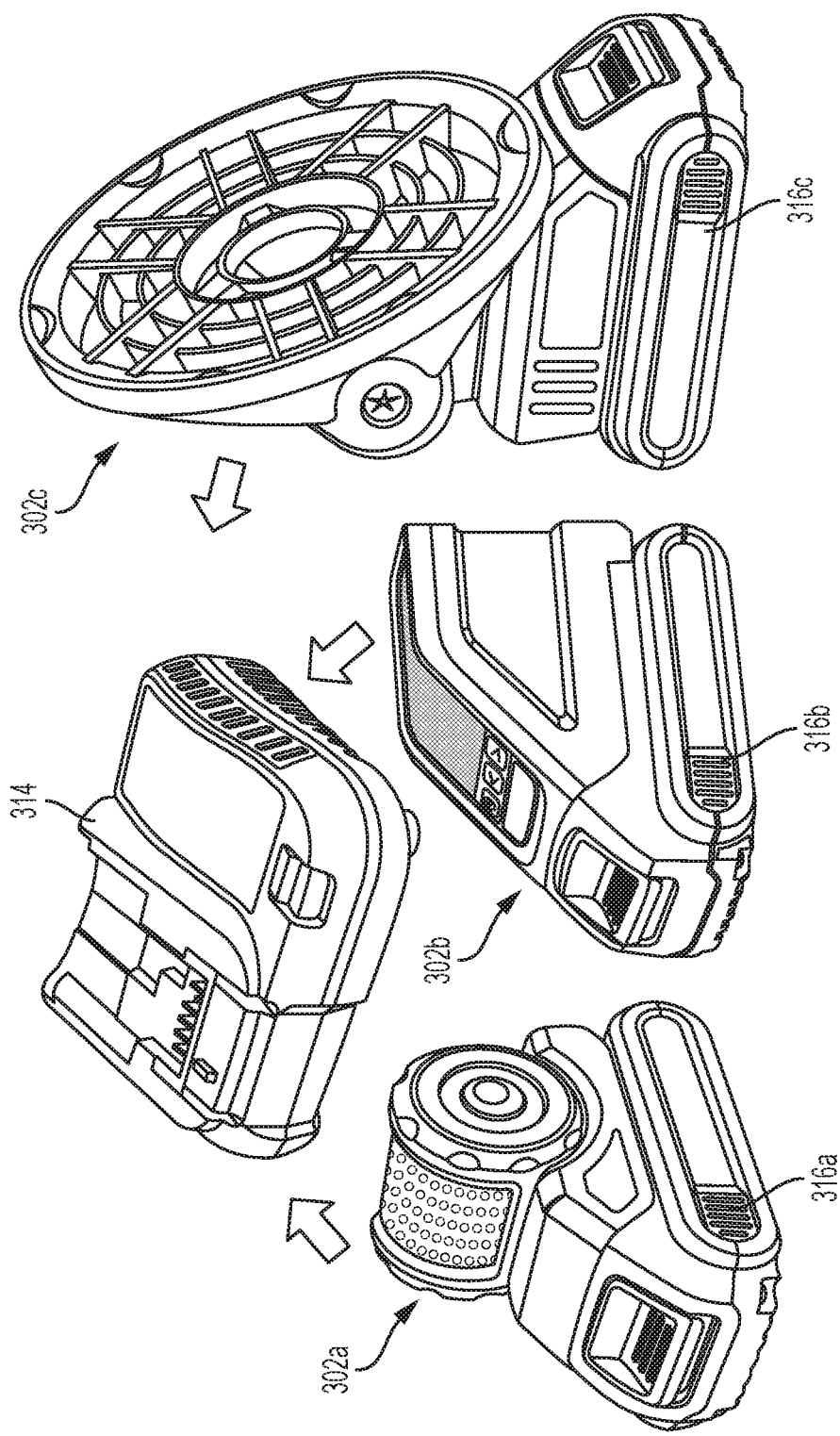
FIG. 3 shows multiple different accessories mated with battery packs and a battery charger.

FIG. 3 illustrates three example accessories attached to battery packs. A light 302a is attached to battery pack 316a, a Bluetooth speaker 302b is attached to battery pack 316b and a fan 302c is attached to battery pack 316c. Each of the three accessories 302a-302c includes a first interface, such as the first interface 104 of FIG. 1 and the first interface 204 of FIG. 2A, and a second interface, such as the second interface 108 of FIG. 1 and the second interface 208 of FIG. 2A. The first interface may be a separate and distinct interface from the second interface. The first interface is for mating the accessories with a battery charger 314 and the second interface is for mating the accessories with a battery pack 316, just like the accessory 202 of FIGS. 2A-2D. Each accessory 302a-302c includes the charger enable circuit 106 of FIG. 1 and the battery management circuit 110 of FIG. 1. As illustrated in FIG. 3, each of the three accessories 302a-302c is mated with a respective battery pack 316a-316c and each of the three accessories 302a-302c is also capable of being connected to a battery charger 314 when not mated with the battery pack.

While the accessories 302a-302c of FIG. 3 include the two interfaces for mating with the battery charger 314 and the battery pack 316, it is also possible in other implementations that other accessories may only include a single interface that is configured to mate with only the battery charger 314 and not a battery pack 316. Alternatively, it is possible that other accessories may only include a single interface that is configured to mate with only the battery pack 316 and not a battery charger 314.

Figure 4:
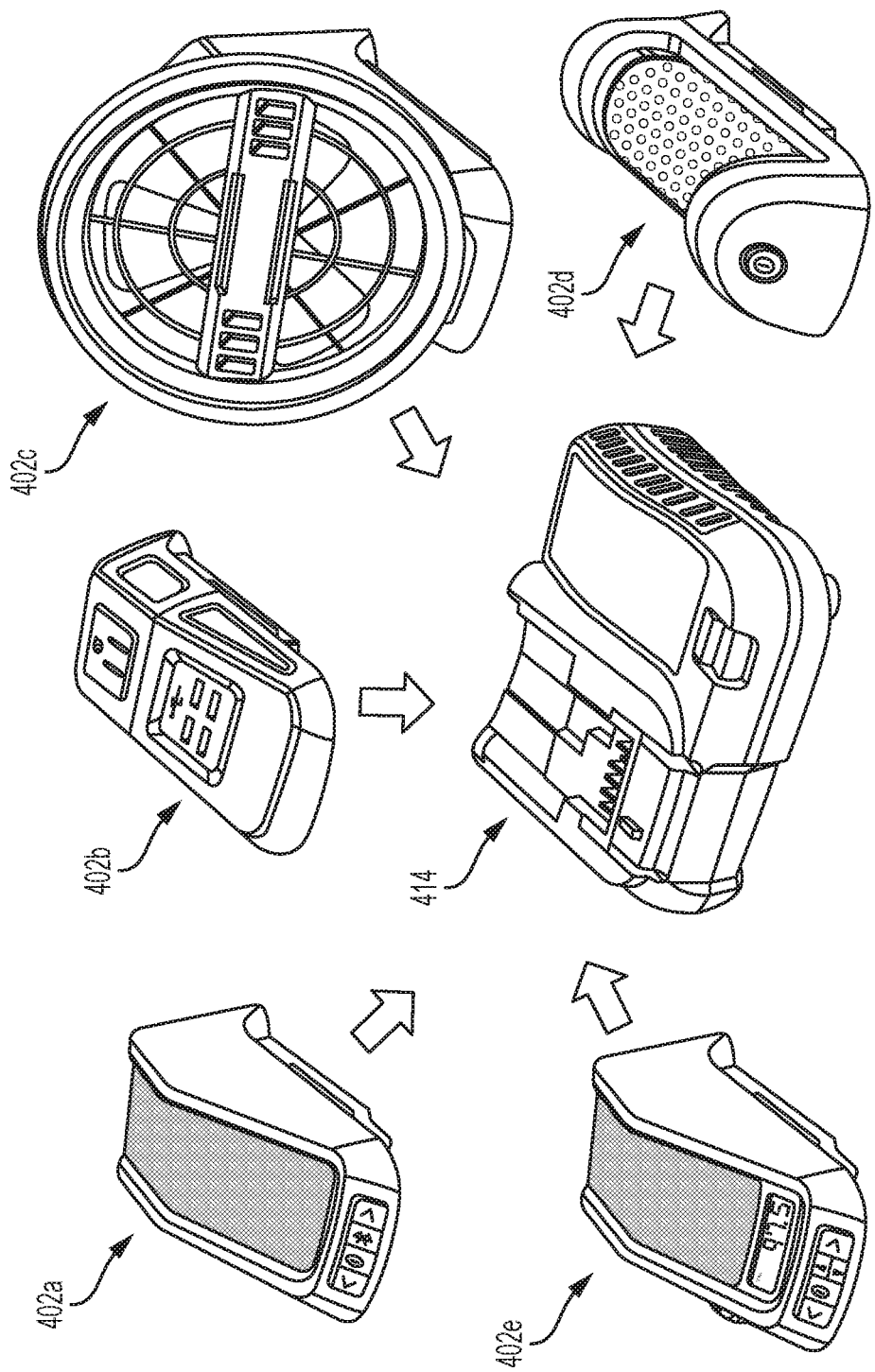
FIG. 4 shows multiple different accessories and a battery charger.

FIG. 4 illustrates five example accessories 402a-402e and a battery charger 414. FIG. 4 illustrates a Bluetooth speaker 402a, a USB/power outlet 402b, a fan 402c, a light 402d and a radio 402e. In this example implementation, the accessories 402a-402e may only include a first interface, such as the first interface 104 of FIG. 1 and the first interface 204 of FIG. 2A, to enable the accessory to mate with and receive power from the battery charger 414. In this example, the accessories 402a-402e also include a charger enable circuit, such as the charger enable circuit 106 of FIG. 1.

FIG. 5 illustrates an example charger enable circuit 506. The charger enable circuit 506 may function like the charger enable circuit 106 of FIG. 1, as described above. As discussed above, in order to receive power, the accessory provides a signal to the battery charger in order to trick the charger to thinking that a battery is present. When the battery charger receives the trick signal, the battery charger provides power to the accessory.

The charger enable circuit 506 includes resistors R1-R7, terminals B+ and B−, cell tap terminals C1-C4, capacitors 530-534 and a battery signal circuit 535. The resistors R1-R5 form a voltage divider that outputs an appropriate voltage to each of the cell tap terminals C1-C4. R6 provides a dummy thermistor signal (TH) that simulates a battery at room temperature. R7 is a dummy identification resistor that tricks the battery charger into thinking that a battery is present with the signal (ID) from the battery signal circuit 535. R7 also can define the signal to the battery charger on the ID terminal to establish how much power to provide to the accessory.

The battery signal circuit 535 is configured to generate and provide the trick signal to the battery charger that something like a battery is inserted into the battery charger when the accessory is mated with the battery charger. When the battery charger receives the trick signal generated by the battery signal circuit 535, the battery charger provides power to the accessory that is in the battery charger. The battery signal circuit 535 also allows the accessory components 512 to pull the appropriate power from the battery charger irrespective of the battery charger charge rate. That is, the battery signal circuit 535 is configured to regulate the power from the battery charger that is provided to the accessory components 512.

Figure 6:
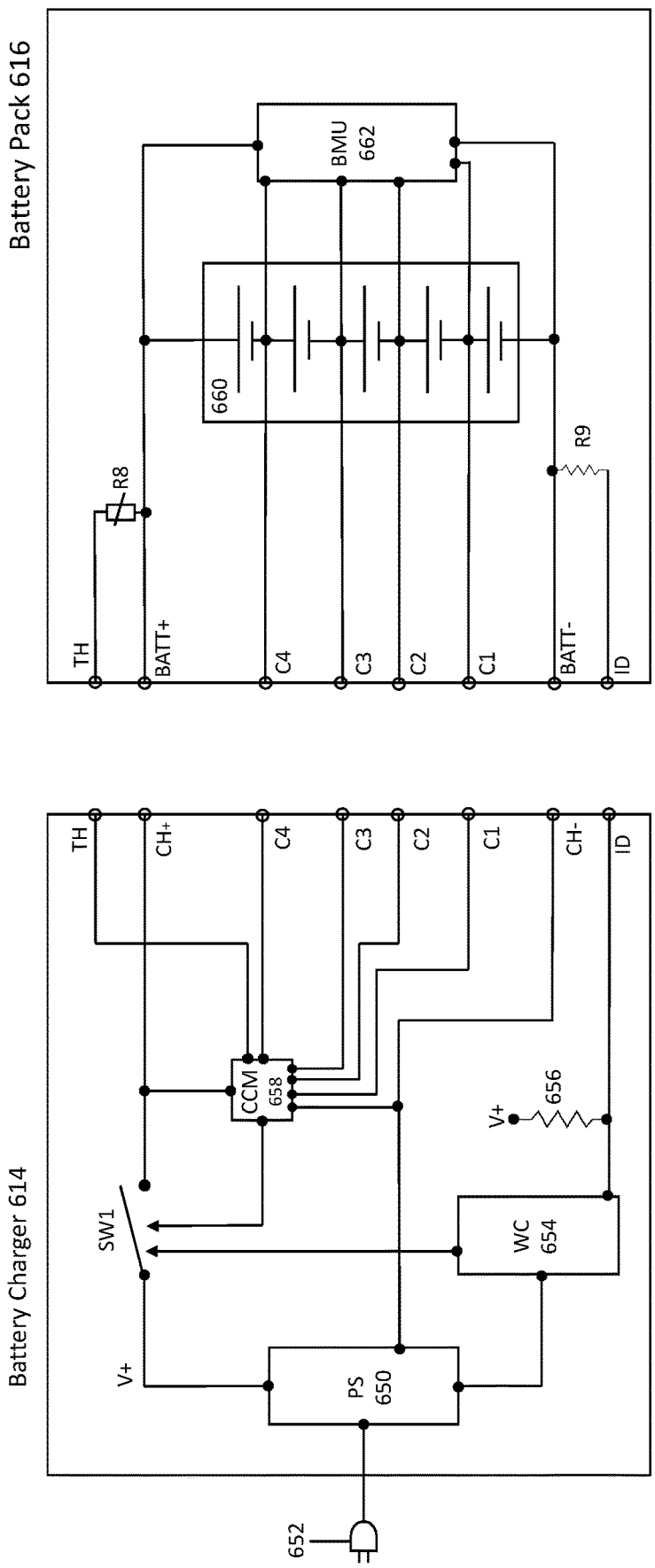
FIG. 6 is a schematic diagram of an example charger and battery pack.
Figure 7:
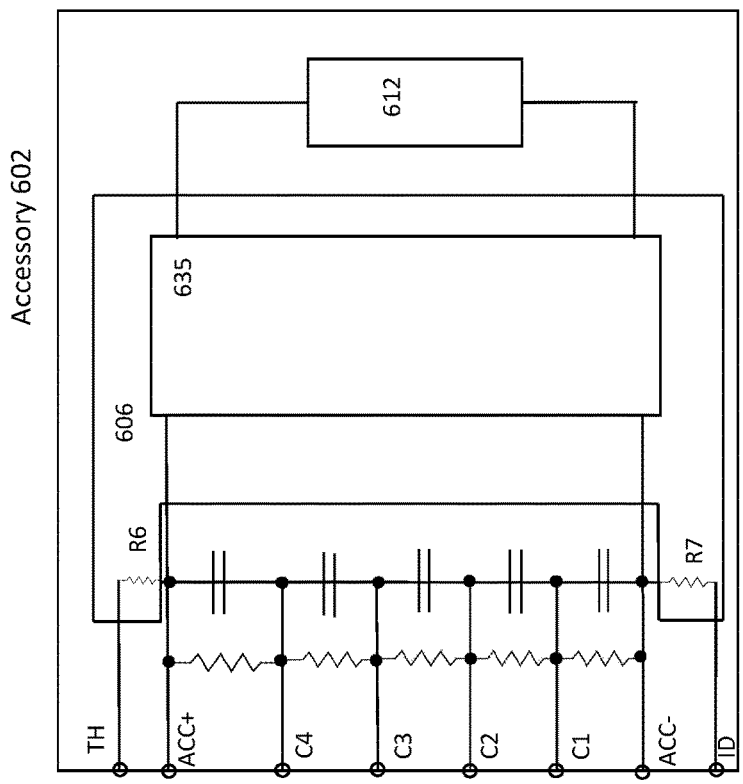
FIG. 7 is a schematic diagram of an example charger and accessory.
Figure 7:
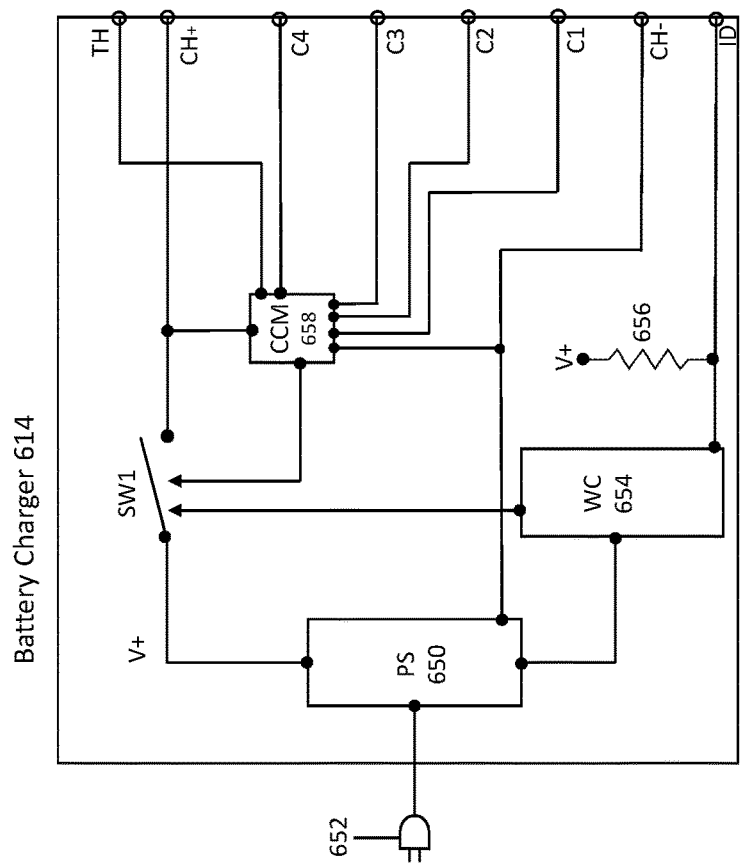

FIGS. 6 and 7 illustrate an alternate embodiment of the present invention. In this alternate embodiment, a battery charger 614 may be separately coupled to a battery pack 616 similar to the battery packs 116, 216, 316 described above and an accessory 602 similar to the accessories 102, 202, 302, 402 described above. In this embodiment, the battery charger 614 is configured to provide a constant current power signal to the battery pack 616 and a constant voltage signal to the accessory. As illustrated in FIG. 6, the battery charger 614 includes an electrical interface for coupling to the battery pack 616 including a set of electrical terminals CH+, CH−, C1, C2, C3, C4, C5, TH and ID. The battery charger 614 also includes a power supply circuit 650. The power supply circuit 650 is coupled to a source of AC power, such as a wall outlet, by a plug 652. The power supply circuit 650, as is well known in the field manages the AC power to provide the desired voltage and/or current to the CH+ and CH− terminals. A power supply switch SW1 couples the power supply circuit to the CH+ terminal. As a default, the power supply circuit 650 provides a constant voltage V+ at a positive output. For example, the constant voltage V+ may be 12 volts. The battery charger 614 also includes a window comparator circuit 654. As window comparators are well known in the field, it will now be described in detail. An input of the window comparator is coupled to the battery charger ID terminal and a first terminal of a pull up resistor 656. A second terminal of the pull up resistor 656 is coupled to the constant voltage V+. A first output of the window comparator is coupled to an input of the power supply circuit 650. A second output of the window comparator is coupled to the power supply switch SW1. The battery charger 614 may also include a charger control module (also referred to as a charger control circuit) 658. The charger control circuit 658 may include a microprocessor, microcontroller or other control electronic circuits. The charger control circuit 658 is coupled to the CH+, CH−, C1, C2, C3, C4, and TH electrical terminals. This allows the charger control circuit 658 to monitor the voltage and/or current on these electrical terminals. The charger control circuit 658 also includes an output coupled to the power supply switch SW1.

As illustrated in FIG. 6, the battery pack 616 includes an electrical interface for coupling to the battery charger 614 including a set of electrical terminals BATT+, BATT−, C1, C2, C3, C4, C5, TH and ID. The battery pack 616 also includes a set of battery cells 660. In this exemplary battery pack, the set of battery cells 660 includes five battery cells coupled in series. The set of battery cells may include a greater or smaller number of battery cells connected in series or in parallel or a combination of series and parallel. Each of the electrical terminals C1, C2, C3, C4 is coupled to a node between adjacent battery cells. The battery pack 616 also includes a thermistor R8 coupled to the TH electrical terminal and to the BATT+ electrical terminal. The battery pack 616 also includes an ID resistor R9 coupled to the ID electrical terminal and the BATT− terminal. The battery pack 616 may also include a battery management unit (also referred to as a battery control circuit) 662. The battery control circuit 662 may include a microprocessor, microcontroller or other control electronic circuits. The battery control circuit 662 is coupled to the BATT+, BATT−, ID and TH electrical terminals and to the nodes between adjacent battery cells. This allows the battery control circuit 662 to monitor the voltage and/or current on these electrical terminals.

FIG. 7 illustrates the battery charger 614 illustrated in FIG. 6 and described above. FIG. 7 also illustrates the accessory 602.

As noted above, FIG. 6 illustrates a battery charger 614 and a battery pack 616 and FIG. 7 illustrates a battery charger 614 and an accessory 602. The battery charger 614 and battery pack 616 of FIG. 6 and the battery charger 614 and the accessory 602 of FIG. 7 are illustrated just prior to coupling. Upon coupling the CH+, CH−, C1, C2, C3, C4, ID and TH electrical terminals of the battery charger 614 connect to the BATT+, BATT−, C1, C2, C3, C4, ID and TH electrical terminals of the battery pack 616, respectively and the CH+, CH−, C1, C2, C3, C4, ID and TH electrical terminals of the battery charger 614 connect to the ACC+, ACC−, C1, C2, C3, C4, ID and TH electrical terminals of the accessory 602. As noted above, the battery charger 614 includes a window comparator 654. The window comparator establishes an upper threshold X and a lower threshold Y. Upon coupling the battery charger 614 to the battery pack 616 or the accessory 602, a voltage is presented to the input of the window comparator 654 based on the circuit including constant voltage V+, the pull up resistor 656 and the battery pack ID resistor R9 or the accessory ID resistor R7, dependent upon which device the battery charger 614 is connected. The battery ID resistor R9 is of a resistance to present a voltage greater than the upper threshold X or less than the lower threshold Y. The accessory ID resistor R7 is of a resistance to present a voltage less than or equal to the upper threshold X and greater than or equal to the lower threshold Y. If the window comparator 654 receives a voltage greater than the upper threshold X or less than the lower threshold Y (indicating a battery pack is coupled to the battery charger), the window comparator outputs (provides) a signal to the power supply circuit 650 to provide a constant current power signal to the CH+ and CH− electrical terminals to charge the battery pack 616. If the charger control circuit 658 determines that the battery pack is in good condition, e.g., the stack voltage is greater than a dead pack threshold, the charger control circuit 658 outputs a signal to close charging switch SW1. As a result, the battery charger 614 will charge the battery pack 616.

If the window comparator 654 receives a voltage less than or equal to the upper threshold X and greater than or equal to the lower threshold Y (indicating an accessory is coupled to the battery charger), the window comparator outputs (provides) a signal to the power supply circuit 650 to provide a constant voltage power signal to the CH+ and CH− electrical terminals to power the accessory 602. The window comparator 654 will also output a signal to close the charging switch SW1. As a result, the battery charger 614 will provide power to the accessory 602.

In the example above, X is 3 volts, Y is 1 volt, the accessory ID resistor R7 is 2550 ohms and the battery charger pull up resistor is 200 Kohms. Therefore, a value of approximately 2 volts would be present to the input of the window comparator 654 when the accessory 602 is coupled to the battery charger 614.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Implementations of the various techniques described herein may be implemented utilizing analog and/or mixed analog and digital circuitry. This would include op amps, resistors, transistors and/or reactive components to perform the control functions. These analog functions could be intermixed with any of the digital implementations embodied previously.

Numerous modifications may be made to the exemplary implementations described above. These and other implementations are within the scope of the following claims.

What is claimed is:

1. A device comprising:
   a housing comprising
   a first interface configured to connect to an interface of a battery charger, the interface of the battery charger configured to mate with an interface of a battery pack,
   a second interface configured to connect to the interface of the battery pack,
   and one or more accessory electronic components that are electrically coupled to the first interface and the second interface to implement a function of the device,
   the first interface and the second interface positioned on the housing such that the device is only able to connect to one of the battery charger and the battery pack at a time; and
   a charger enable circuit electrically connected between the first interface and the accessory electronic components, the charger enable circuit configured to send a signal to the battery charger to indicate a presence of the battery pack when the device is electrically coupled to the battery charger and not electrically coupled to the battery pack.

2. The device of claim 1, wherein the first interface has a configuration that would mate with a configuration of the second interface.

3. The device of claim 1, wherein the first interface includes a female terminal to connect to the battery charger.

4. The device of claim 1, wherein the second interface includes a male terminal to connect to the battery pack.

5. The device of claim 1, wherein the charger enable circuit comprises a battery signal circuit that is configured to generate the signal that is sent to the battery charger.

6. The device of claim 5, wherein the battery signal circuit is configured to regulate power received from the battery charger.

7. The device of claim 1, wherein the accessory components include a fan.

8. The device of claim 1, wherein the accessory components include a radio.

9. The device of claim 1, wherein the accessory components include a speaker.

10. The device of claim 1, wherein the accessory components include a light.

11. The device of claim 1, wherein the accessory components include a power adapter.

12. A device comprising:
    a first interface configured to connect to an interface of a battery charger, the interface of the battery charger configured to mate with an interface of a battery pack;
    a charger enable circuit electrically connected to the first interface, the charger enable circuit configured to send a signal to the battery charger to indicate a presence of the battery pack when the device is electrically coupled to the battery charger and not electrically coupled to the battery pack; and
    one or more accessory electronic components that are electrically coupled to the first interface to implement a function of the device.

13. The device of claim 12, wherein the charger enable circuit comprises a battery signal circuit that is configured to generate the signal that is sent to the battery charger.

14. The device of claim 13, wherein the battery signal circuit is configured to regulate power received from the battery charger.

* * * * *